United States Patent [19]

Smearing et al.

[11] Patent Number: 4,543,368

[45] Date of Patent: Sep. 24, 1985

[54] FOAMABLE POLYETHERIMIDE RESIN FORMULATION

[75] Inventors: Robert W. Smearing; Daniel E. Floryan, both of Pittsfield, Mass.

[73] Assignee: General Electric Company, Pittsfield, Mass.

[21] Appl. No.: 669,859

[22] Filed: Nov. 9, 1984

[51] Int. Cl.$^4$ ................................................ C08J 9/10
[52] U.S. Cl. ........................................ 521/90; 521/94; 521/180; 521/189
[58] Field of Search ................... 521/180, 189, 90, 94

[56] References Cited

U.S. PATENT DOCUMENTS

| | | | |
|---|---|---|---|
| 4,097,425 | 6/1978 | Niznik | 521/90 |
| 4,097,671 | 6/1978 | Niznik | 521/90 |
| 4,158,094 | 6/1979 | Niznik | 521/90 |
| 4,163,037 | 7/1979 | Niznik | 521/90 |

*Primary Examiner*—Morton Foelak
*Attorney, Agent, or Firm*—Bernard, Rothwell & Brown

[57] ABSTRACT

The present invention relates to a foamable polyetherimide resin. These foamable polyetherimides have an effective amount of a chemical blowing agent which decomposes at a temperature equal to or greater than the glass transition temperature of the polyetherimide resin and does not have an adverse effect on the polyetherimide.

14 Claims, No Drawings

FOAMABLE POLYETHERIMIDE RESIN FORMULATION

BACKGROUND OF THE INVENTION

The present invention relates to foamable thermoplastics. More particularly, the invention concerns polyetherimides containing effective amounts of a chemical blowing agent.

Polyetherimides are unique polymers which exhibit superior physical and chemical properties, including high heat resistance, exceptional strength and excellent processability. These polymers can be used as wire coatings and are particularly suited for injection molding applications. Because of their excellent properties, these polymers are often used in high performance applications, where they are exposed to a variety of conditions and high mechanical loads. Although polyetherimides are excellently suited to such applications, there is a continuing need for high performance and yet light weight polymers, particularly those that can be formed into useful articles by the relatively convenient and inexpensive technique of injection molding.

As will be more fully described herein, polyetherimides may be made by a variety of synthetic procedures. Presently, the preferred procedures for the commercial production of these polymers involves a step known as "melt polymerization." In the melt polymerization process, a mixture of an aromatic bis(ether anhydride) and an organic diamine (or a prepolymer thereof) is introduced into a heated extruder, wherein the reactants are melted. The reaction of these components occurs in the molten state, and the molten product is extruded through a die, after which it is cooled and chopped into pellets that can be conveniently utilized in injection molding applications. The processing temperatures associated with these production techniques can be quite high. For example, temperatures on the order of 400° C. and higher are employed in the extruder. Moreover, because of the high glass transition temperatures of these resins, injection molding must generally be conducted at similarly high temperatures.

A wide variety of conventional polymers are foamed by the use of chemical blowing agents. Such polymers include polystyrene, polyethylene, polypropylene, polycarbonate, ABS, modified phenylene oxide, polyurethanes, and polyesters. Numerous chemical blowing agents have been developed and are employed for producing various foamed polymers. Such blowing agents include inert gases hydrocarbons such as pentane, or fluorocarbons, halocarbons, and unsymetrical t-alkylazoalkanes, to name a few. For a review of the factors involved with the foaming of polymers using chemical blowing agents. See *Modern Plastics Encyclopedia*, 1982-1983, pp. 272-289.

Because of the elevated temperatures involved in the production and processing of polyetherimides, imparting foamability to the polymer by incorporation of chemical blowing agents has proved to be difficult. Typical high temperature chemical blowing agents such as 5-phenyltetrazole, decompose to yield aromatic amines which can deleteriously affect the polymer. Chemical blowing agents typically decompose at a temperature far below the glass transition temperature of the polyetherimide.

Important considerations for the selection of a chemical blowing agent include the compatiblity of the blowing agent with the polymer system, the temperature at which decomposition takes place, and the effect of the blowing agent on various physical properties of the polymer including rigidity, density, strength and flexibility. In general, foamed polymers using chemical blowing agents have heretofore been limited to relatively low temperature applications. For example, polymers that are manufactured and processed at temperatures lower than about 175° C. and usually below about 150° C. The chemical blowing agents used to foam such polymers have generally been found unsatisfactory for the foaming of polyetherimides, because of one or more of the considerations recited above. In particular, such chemical blowing agents have met with limited success for polyetherimides because of the high processing temperatures employed and the adverse effects of products resulting from the decomposition of the blowing agent.

Accordingly, there is a continuing need for foamed polyetherimides whose useful properties meet certain standards not met by those polymers presently available.

SUMMARY OF THE INVENTION

In accordance with the present invention, a foamable thermoplastic resin comprises a polyetherimide and an effective amount of a dihydrooxadiazinone. These compositions surprisingly exhibit excellent properties over other foamable polymers. As a result, such compositions are suitable for applications which have heretofore been unfilled.

DETAILED DESCRIPTION

There is disclosed a foamable thermoplastic resin comprising a polyetherimide and an effective amount of a dihydrooxidiazinone.

The compositions of the present invention include a polyetherimide of the formula:

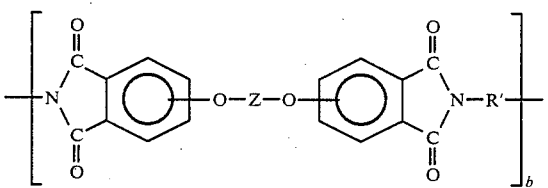

where "b" represents a whole number in excess of 1, e.g., 10 to 10,000 or more, Z is a member selected from the class consisting of (1):

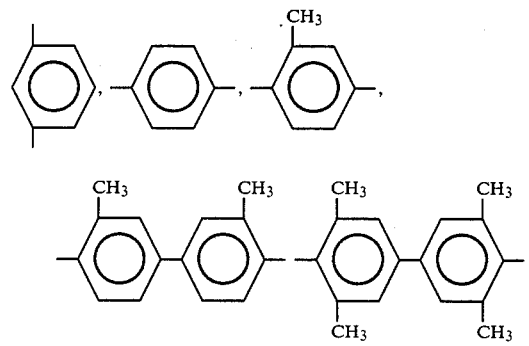

-continued

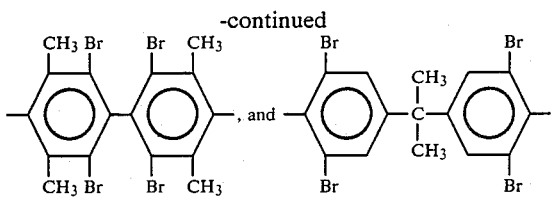

and (2) divalent organic radicals of the general structural formula:

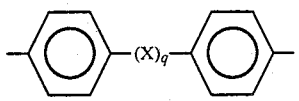

where X is a member selected from the class consisting of divalent radicals of the formulas,

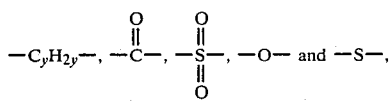

where q is 0 or 1, y is an integer from 1 to 5, and the divalent bonds of the —O—Z—O— radical are situated on the phthalic anhydride end groups, e.g., in the 3,3', 3,4', 4,3' or the 4,4' positions, and R' is a divalent organic radical selected from the class consisting of aromatic hydrocarbon radicals having from 6 to about 20 carbon atoms and halogenated derivatives thereof, alkylene radicals and cycloalkylene radicals having from about 2 to about 20 carbon atoms, $C_{(2-8)}$ alkylene terminated polydiorganosiloxane, and divalent radicals of the formula:

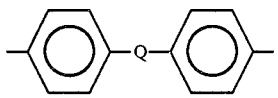

where Q is a direct bond or a member selected from the class consisting of

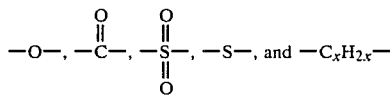

and x is an integer from 1 to 5.

The polyetherimides can be obtained by any of the methods well known to those skilled in the art including the reaction of any aromatic bis(ether anhydride)s of the formula:

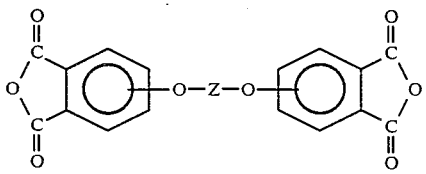

where Z is as defined hereinbefore with an organic diamine of the formula:

$$H_2N-R'-NH_2$$

where R' is as defined hereinbefore.

Aromatic bis(ether anhydride)s of the above formula include, for example, 2,2-bis[4-2,3-dicarboxyphenoxy)-phenyl]phenyl ether dianhydride; 1,3-bis(2,3-dicarboxyphenoxy)benzene dianhydride; 4,4'-bis(2,3-dicarboxyphenoxy)diphenyl sulfide dianhydride; bis(2,3-dicarboxyphenoxy)benzophenone dianhydride; 4,4'-bis(2,3-dicarboxyphenoxy)diphenyl sulfone dianhydride; etc., 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxy phenoxy)diphenyl-2,2-propane dianhydride; etc. and mixtures of such dianhydrides.

Aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. Additional dianhydrides are shown by M. M. Koton, F. S. Florinski, Zh. Org. Khin., 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis($\beta$-amino-t-butyl)toluene, bis(p-$\beta$-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexaethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis-(3-aminopropyl)tetramethyldisiloxane, bis-(4-aminobutyl)tetramethyldisiloxane and the like, and mixtures of such diamines.

In general, the reactions advantageously can be carried out by employing well-known solvents, e.g., odichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the aforementioned dianhydrides with any of the aforementioned diamino compounds while heating the mixture of the ingredients to an elevated temperature with concurrent intermixing. Generally, melt polymerization temperatures between about 200° to 400° C. or higher are employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al. 3,847,867, Williams 3,847,869, Takekoshi et al. 3,850,885, White 3,852,242 and 3,855,178. These disclosures are incorporated herein in their entirety by reference for the purpose of teaching, by way of illustration, general and specific methods for preparing polyetherimides suitable for the use in the invention.

The foamable polyetherimides of the present invention include chemical blowing agents which upon decomposition in the presence of the polymer not only render suitable foamed polymers, but additionally, do not introduce substantial amounts of undesirable moieties, such as aromatic amines, which adversely affect the polymer.

The foamable polyetherimides of the present invention include an effective amount of a dihydrooxadiazinone as the blowing agent. Such dihydrooxadiazinones include those of the formula:

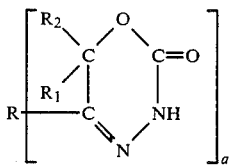

wherein "a" is an integer equal to 1 or 2, R is a monovalent radical when "a" is 1 and R is a divalent radical when "a" is 2, and R is selected from alkyl radicals, aryl radicals, alkylene radicals, arylene radicals, substituted aryl radicals or substituted arylene radicals, and $R_1$ and $R_2$ are monovalent or divalent radicals which can be the same or different and are selected from hydrogen, alkyl, alkylene, a cycloaliphatic ring structure including $R_1$ and $R_2$, alkoxy radicals and aryloxy radicals, etc. When either of $R_1$ or $R_2$ is divalent (e.g., alkylene), two dihydrooxadiazinone rings may be joined through that radical.

Radicals included by R are $C_{(1-8)}$ alkyl radicals, such as methyl, ethyl, propyl, butyl, etc.; aryl radicals such as phenyl, tolyl, xylyl, napthyl, anthryl, etc.; $C_{(1-8)}$ alkylene radicals; phenylene, xylylene, etc.; halo alkyls such as chloroethyl, trifluoropropyl, etc.; halo aryls such as chlorophenyl, bromotolyl, etc.; nitro aryls and sulfoaryls. Radicals included by $R_1$ and $R_2$ are hydrogen and $C_{(1-8)}$ alkyl radicals such as methyl, ethyl, propyl, etc.; alkoxy radicals such as methoxy, ethoxy, propoxy, butoxy, etc.; aryloxy radicals such as phenoxy, cresoxy, napthoxy, etc. In particular instances where $R_1$ and $R_2$ are both alkyl they can be part of a cycloaliphatic ring structure which includes the carbon atom of the dihydrooxadiazinone ring. Such cycloaliphatic ring structures include cyclopentyl, cyclohexyl, cycloheptyl, and the like.

The dihydrooxadiazinones that are used in the present invention have been described in the following U.S. Pat. Nos.: 4,097,425; 4,097,671; 4,158,094; 4,160,088, and 4,163,037, all of which are incorporated herein by reference.

Included by the dihydrooxadiazinones of the above structural formula are, for example:
5,6-dimethyl-3,6-dihydro-1,3,4-oxadiazin-2-one,
5,6,6-trimethyl-3,6-dihydro-1,3,4-oxadiazin-2-one,
5-ethyl-6-methoxy-3,6-dihydro-1,3,4-oxadiazin-2-one,
5-phenyl-3,6-dihydro-1,3,4-oxidiazine-2-one,
5,6-diphenyl-3,6-dihydro-1,3,4-oxadiazin-2-one,
5-(p-bromophenyl)-3,6-dihydro-1,3,4-oxadiazin-2-one,
5-phenyl-6-methyl-3,6-dihydro-1,3,4-oxadiazin-2-one,
5,6-bis(p-methoxylphenyl)-3,6-dihydro-1,3,4-oxadiazin-2-one,
5-napthyl-3,6-dihydro-1,3,4-oxadiazin-2-one,
5-(o,o,p-tribromophenyl)-6-propyl-3,6-dihydro-1,3,4-oxadiazin-2-one,
5-(p-hydroxyphenyl)-3,6-dihydro-1,3,4-oxadiazin-2-one,
5-phenyl-6,6-cyclopentylene-3,6-dihydro-1,3,4-oxadiazin-2-one, and such polycyclic formulas resulting from divalent substitution as

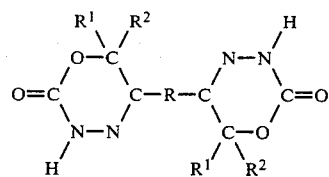

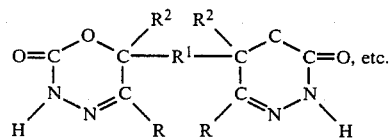

In forming the foamable polyetherimides, an effective amount of the blowing agent is incorporated into the polyetherimide resin. The effective amounts should be that amount which upon decomposition produces foamed polymer. Generally, the blowing agent is employed in an amount ranging from about 0.1 to about 50 parts by weight, preferably about 20 parts by weight of the chemical blowing agent per 100 parts of the foamable polymer. Preferably from 0.1 to 2 parts and particularly preferred 0.2 to 0.5 parts are used.

In producing the foamable resins, a variety of procedures may be used to combine the polyetherimide resin and the chemical blowing agent. When using 5-phenyl-3,6-dihydro-1,3,4-oxadiazin-2-one as the blowing agent the polyetherimide may be contacted with the blowing agent while the blowing agent is in a molten state but below its decomposition temperature. For example the polyetherimide and blowing agent may be combined and heated to a temperature such that the blowing agent is in a molten state and thus is incorporated into the polyetherimide. Thereafter the treated resin is cooled and can be stored until such time as it is used.

Another method of combining the polymer and molten blowing agent is to preheat the polymer to a temperature below the decomposition temperature of the blowing agent and add the blowing agent in its molten form, blend the two, cool and thereafter the foamable resin is ready for use.

Various other modifications include spraying the polyetherimide with a solution of the blowing agent and thereafter flashing off the solvent thus coating the blowing agent onto and within the polyetherimide. Another alternative is to pass strands of polyetherimide resin through a solution of molten blowing agent and thereafter chopping the strands to produce a pelleted foamable polyetherimide. In practicing the present invention one may optionally use the powder form of the blowing agent so long as it is substantially uniformly distributed throughout the polyetherimide.

For purposes of economics, it is sometimes advantageous to incorporate a chemical blowing agent into the polyetherimide at relatively high concentrations to make a concentrate. It has been discovered that some chemical blowing agents, for example, 5-phenyl-3,6-dihydro-1,3,4-oxadiazin-2-one, act as plasticizers for polyetherimides. Taking advantage of this property, the glass transition temperature of the polyetherimide can be lowered to permit the polyetherimide to be processed at low temperatures, i.e., 175°–200° C. The normal processing temperatures of polyetherimides are often as high as 400° C. Therefore concentrates containing up to about 15–50% by weight of the blowing agent in the polyetherimide can be made without decomposing the blowing agent. Preferably, the concentrates contain from about 15 to about 30% by weight of the blowing agent, with about 20% to about 25% being particularly preferred. Such concentrates can be blended with polyetherimides by conventional techniques to yield homogeneous polymers. Thereafter, upon processing the foamable polyetherimide, a foamed polyetherimide is produced at temperatures suitable to decompose the blowing agent and yet at temperatures equal to or above the glass transition temperatures of the polymers.

EXAMPLE I

A concentrated foamable polyetherimide resin was formed by mechanically blending 20 parts by weight of 5-phenyl-3,6-dihydro-1,3,4-oxadiazine-2-one (PDOX) and 80 parts by weight of ULTEM ® brand of polyetherimide resin obtained from General Electric Company, Pittsfield, Mass. U.S.A. which had been previously ground to 20 mesh or less. The foamable resin had an intrinsic viscosity of 0.38–0.42 in chloroform. The resin was predried for 8 hours at 121° C.

The premix was placed in an extruder with a barrel temperature of 188°–199° C. The extruder used a low sheer "compounding screw" to minimize frictional heating. The resulting stock temperature was 199°–216° C. The extruded strand was water quenched and chopped. The amount of PDOX present was determined by thermogravimetric analysis.

The concentrate was then blended with predried polyetherimide resin, 10% and 30% glass-filled polyetherimide resin at a level of 2% by weight. The resulting blends were then extruded on a foam molding press (Reed) with a barrel profile range of 306°–370° C. The mold was set at 93° C. Standard tensile and flexural specimens (63.5 mm thick) were molded and tested. The results are listed in Table I.

TABLE I

| | (Molded Using PDOX Concentrate) | | | |
|---|---|---|---|---|
| Property | Test Method ASTM | Polymer | 10% Glass Filled | 30% Glass Filled |
| Molded density, gm/cc | D792 | .90 | .95 | 1.10 |
| Tensile Strength, psi | D638 | 8,960 | 10,250 | 12,380 |

TABLE I-continued

| | (Molded Using PDOX Concentrate) | | | |
|---|---|---|---|---|
| Property | Test Method ASTM | Polymer | 10% Glass Filled | 30% Glass Filled |
| Tensile Modulus, psi | D638 | 232,000 | 311,000 | 622,000 |
| % Elongation at break | D638 | 6.2 | 5.0 | 4.0 |
| Flexural Strength, psi | D790 | 13,380 | 17,850 | 20,180 |
| Flexural Modulus, psi | D790 | 324,000 | 510,000 | 853,000 |
| Heat Distortion Temperature 264 psi, °F. | D548 | 364 | 392 | 399 |
| Unnotched Impact ft-lb/in | D256 | 6.3 | 5.7 | 5.9 |

EXAMPLE II

A polyetherimide resin was dried overnight at a temperature of 121° C. After the resin was sufficiently dried, PDOX was dry blended with the resin at a 0.5% by weight level. This premix was molded using a foam molding machine (Reed). The temperature profile was in the range of 306°–343° C. The molded parts were tested and the test results are given in Table II.

TABLE II

| | (Molded Using Dry Blended PDOX) | | |
|---|---|---|---|
| Property | Test Method ASTM | Polymer | Polymer |
| Molded Density, gm/cc | D792 | .90 | 1.10 |
| Tensile Strength, psi | D638 | 7,800 | 11,000 |
| Tensile Modulus, psi | D638 | 292,000 | 377,000 |
| Flexural Strength, psi | D790 | 12,000 | 16,000 |
| Flexural Modulus, psi | D790 | 329,000 | 393,000 |
| Heat Distortion Temperature 264 psi, °F. | D548 | 374 | 378 |
| Unnotched Impact ft-lb/in | D256 | 3.7 | — |

EXAMPLE III

For comparative purposes, various commercial blowing agents were blended with a polyetherimide resin. The blowing agents were 5PT (5-phenyl tetrazole) Expandex 150 (the calcium salt of 5-phenyl tetrazole) and Expandex 175 (the barium salt of 5-phenyl tetrazole). These blowing agents are sold by Olin Chemicals of Stamford, Conn. Each sample was prepared by dry blending 0.5 parts by weight of the blowing agent with 99.5 parts by weight of the polyetherimide. The resulting blend was then extruded and tested as in Example II. The results of the tests are listed in Table III. While the physical properties are comparable to those of the compositions described in Example II, analysis shows the presence of amine monomers. These materials are generated as a result of the presence of undesirable solid amine byproducts from the 5-phenyl tetrazole type blowing agents. Such amine monomers were not detected in the compositions of Example II.

TABLE III

| | (Molded Using Dry Blended Expandex) | | | | |
|---|---|---|---|---|---|
| | 5 PT | Expandex 150 | Expandex 150 | Expandex 175 | Expandex 175 |
| Molded Density, g/cc | 0.95 | 0.90 | 1.10 | 0.90 | 1.10 |
| Tensile | 8,000 | 6,300 | 10,000 | 7,100 | 12,000 |

TABLE III-continued

| | (Molded Using Dry Blended Expandex) | | | | |
|---|---|---|---|---|---|
| | 5 PT | Expandex 150 | Expandex 150 | Expandex 175 | Expandex 175 |
| Str., psi Tensile | 317,000 | 289,000 | 359,000 | 307,000 | 320,000 |
| Mod., psi Flexural | 13,000 | 13,000 | 15,000 | 13,000 | 15,000 |
| Str., psi Flexural | 332,000 | 324,000 | 380,000 | 323,000 | 381,000 |
| Mod., psi HDT 264 psi, °F. | 358 | 372 | 374 | 374 | 383 |
| Unnotched Impact ft. lbs/in | 6.2 | | | | 7.4 |

The foamable polyetherimides of the present invention have applications in a wide variety of physical shapes and form, including the use as sheets, molding compounds, coatings, etc. When used as sheets or when made into molded products, these foamed polyetherimides not only possess good physical properties at room temperature but they retain their strength at elevated temperatures for long periods of time. Foamed sheets made from the present invention may be used in the same applications as foamed sheets made from other polymers. Thus, the compositions of the present invention can be used in automotive and aviation applications for decorative or protective purposes and for container and container linings. Molding compositions and molded articles may be formed from the foamable compositions of the present invention by incorporating such fillers as as asbestos, glass fibers, talc, quartz, carbon fibers, finely divided carbon, silica, into such compositions prior to molding. Foamed articles are formed under heat or under heat and pressure in accordance with practices well known in the art. In addition, various heat resistant pigments and dyes may be incorporated as well as various types of inhibitors depending on the application intended.

We claim:

1. A foamable thermoplastic resin comprising a polyetherimide and an effective amount of a chemical blowing agent wherein and blowing agent is of the structural formula:

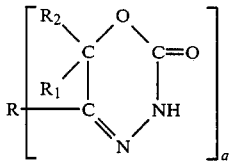

where "a" is an integer equal to 1 or 2, R is a monovalent radical when "a" is 1 and R is a divalent radical when "a" is 2 and R is selected from alkyl radicals and aryl radicals, alkylene radicals, arylene radicals, substituted aryl radicals or substituted arylene radicals and $R_1$ and $R_2$ are monovalent or divalent radicals which can be the same or different selected from hydrogen, alkyl, alkylene, a cyclo-aliphatic ring including $R_1$ and $R_2$ alkoxy radicals and aryloxy radicals; and wherein the polyetherimide is represented by the formula:

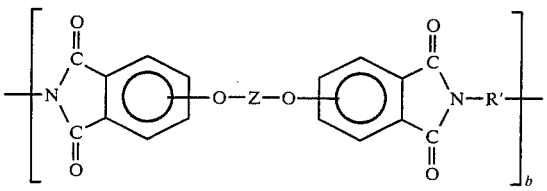

where "b" is an integer from 10 to 10,000, Z is a member selected from the class consisting of: (1)

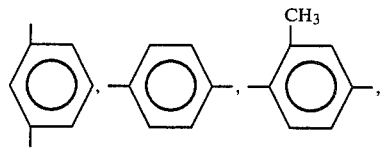

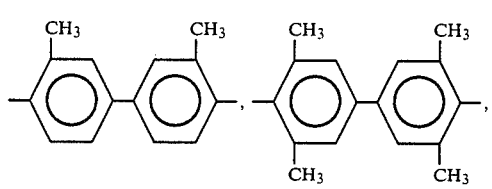

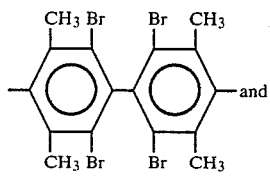

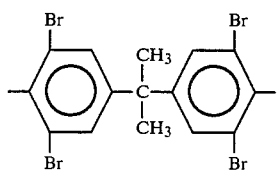

and (2) divalent organic radicals of the general structural formula:

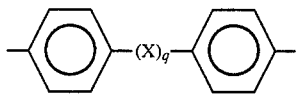

where X is a member selected from the class consisting of divalent radicals of the formulas,

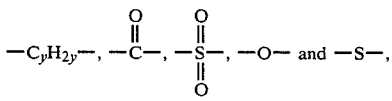

where q is 0 or 1, y is an integer from 1 to 5, and the divalent bonds of the —O—Z—O— radical are situated on the phthalic anhydride end groups, e.g., in the 3,3', 3,4', 4,3' or the 4,4' positions and R', is a divalent organic radical selected from the class consisting of aromatic hydrocarbon radicals having from 6 to about 20 carbon atoms and halogenated derivatives thereof, alkylene radicals and cycloalkylene radicals having from about 2 to about 20 carbon atoms, C(2-8) alkylene terminated polydiorganosiloxane, and divalent radicals of the formula:

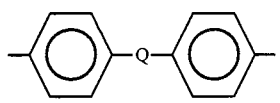

where Q is a direct bond or a member selected from the class consisting of

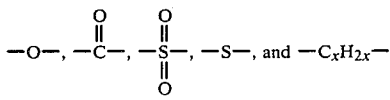

and x is an integer from 1 to 5.

2. The foamable thermoplastic of claim 1 wherein R is selected from the group consisting of aryl radicals selected from the class consisting of tolyl, xylyl, naphthyl, halogenated aryl radicals selected from the class consisting of halophenyl, halotolyl, haloxylyl and halonaphthyl, alkoxy aryl radicals selected from the class consisting of alkoxy phenyl, alkoxy tolyl, alkoxy xylyl and alkoxy naphthyl, nitroaryl radicals selected from the class consisting of nitro phenyl, nitro tolyl, nitro xylyl and nitro naphthyl, sulfoaryl radicals selected from the class consisting of sulfo phenyl, sulfo tolyl, sulfo xylyl and sulfo naphthyl.

3. The foamable thermoplastic of claim 1 wherein R is monovalent and $R_1$ and $R_2$ are each a hydrogen radical.

4. The foamable thermoplastic resin of claim 1 wherein said chemical blowing agent is 5-phenyl-3,6-dihydro-1,3,4-oxadiazin-2-one.

5. The foamable thermoplastic resin of claim 1 wherein the Z is:

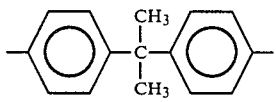

and R is selected from

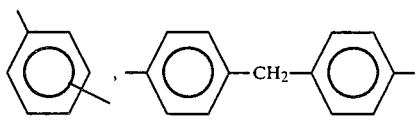

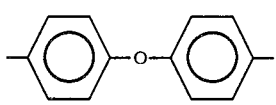

6. The foamable thermoplastic resin of claim 5 wherein said polyetherimide is of the formula:

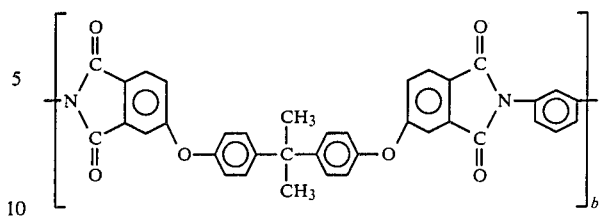

7. The foamable thermoplastic resin of claim 1 wherein said polyetherimide comprises from about 50 to about 99.9 percent by weight of a polyetherimide and from about 0.1 to about 50 percent by weight of a chemical blowing agent.

8. The foamable thermoplastic resin of claim 7 wherein said resin comprises from about 0.1 to about 20 percent by weight of a said chemical blowing agent.

9. The foamable thermoplastic resin of claim 8 wherein said resin comprises from about 0.1 to about 2 percent by weight of said chemical blowing agent.

10. The foamable thermoplastic resin of claim 9 wherein said resin comprises from about 0.2 to about 0.5 percent by weight of a chemical blowing agent.

11. A concentrated polyetherimide resin containing from about 15 to 50% by weight of a blowing agent of the structural formula:

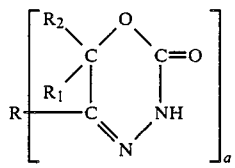

where "a" is an integer equal to 1 or 2, R is a monovalent radical when "a" is 1 and R is a divalent radical when "a" is 2 and R is selected from alkyl radicals and aryl radicals, alkylene radicals, arylene radicals, substituted aryl radicals or substituted arylene radicals and $R_1$ and $R_2$ are monovalent or divalent radicals which can be the same or different selected from hydrogen, alkyl, alkylene, a cyclo-aliphatic ring including $R_1$ and $R_2$ alkoxy radicals and aryloxy radicals; and wherein the polyetherimide is represented by the formula:

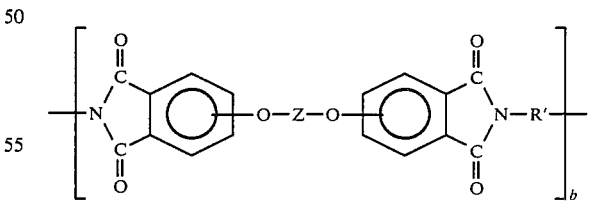

where "b" is an integer from 10 to 10,000, Z is a member selected from the class consisting of: (1)

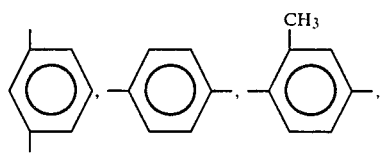

-continued

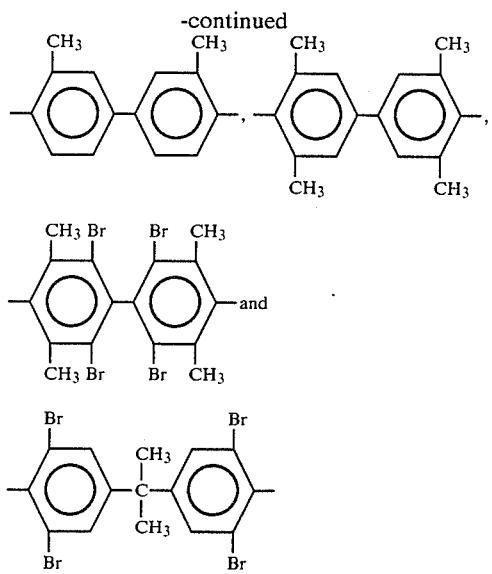

and (2) divalent organic radicals of the general structural formula:

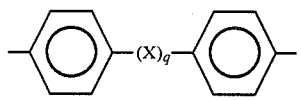

where X is a member selected from the class consisting of divalent radicals of the formulas, $$-C_yH_{2y}-, -\overset{O}{\underset{\|}{C}}-, -\overset{O}{\underset{\underset{\|}{O}}{\overset{\|}{S}}}-, -O- \text{ and } -S-,$$

where q is 0 or 1, y is an integer from 1 to 5, and the divalent bonds of the —O—Z—O— radical are situated on the phthalic anhydride end groups, e.g., in the 3,3′, 3,4′, 4,3′ or the 4,4′ positions and R′, is a divalent organic radical selected from the class consisting of aromatic hydrocarbon radicals having from 6 to about 20 carbon atoms and halogenated derivatives thereof, alkylene radicals and cycloalkylene radicals having from about 2 to about 20 carbon atoms, $C_{(2-8)}$ alkylene terminated polydiorganosiloxane, and divalent radicals of the formula:

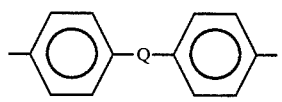

where Q is a direct bond or a member selected from the class consisting of $$-O-, -\overset{O}{\underset{\|}{C}}-, -\overset{O}{\underset{\underset{\|}{O}}{\overset{\|}{S}}}-, -S-, \text{ and } -C_xH_{2x}-$$

and x is an integer from 1 to 5.

12. A process for producing a foamable thermoplastic resin comprising contacting a polyetherimide resin with a chemical blowing agent in a molten state but below the decomposition temperatures of said blowing agent wherein said blowing agent is of the formula:

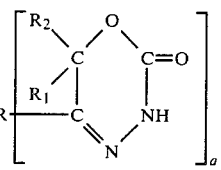

where "a" is an integer equal to 1 or 2, R is a monovalent radical when "a" is 2 and R is a divalent radical when "a" is 2 and R is selected from alkyl radicals and aryl radicals, alkylene radicals, arylene radicals, substituted aryl radicals or substituted arylene radicals and $R_1$ and $R_2$ are monovalent or divalent radicals which can be the same or different selected from hydrogen, alkyl, alkylene, a cyclo-aliphatic ring including $R_1$ and $R_2$ alkoxy radicals and aryloxy radicals; and wherein the polyetherimide is represented by the formula:

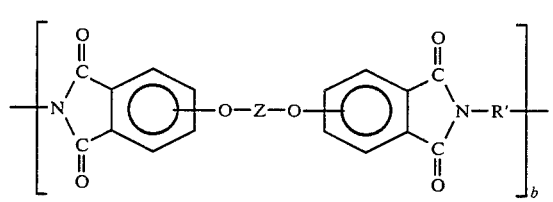

where "b" is an integer from 10 to 10,000, Z is a member selected from the class consisting of: (1)

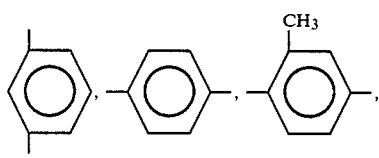

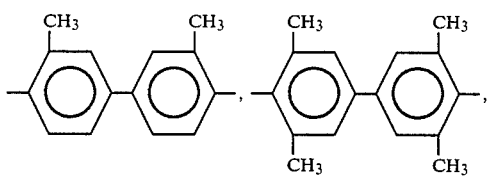

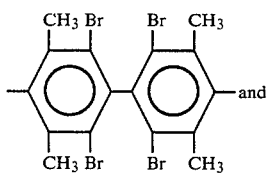

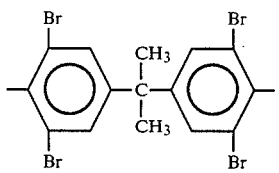

and (2) divalent organic radicals of the general structural formula:

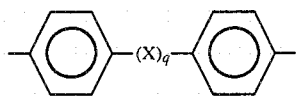

where X is a member selected from the class consisting of divalent radicals of the formulas,

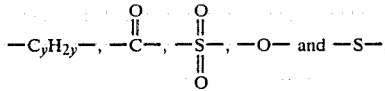

where q is 0 or 1, y is an integer from 1 to 5, and the divalent bonds of the —O—Z—O— radical are situated on the phthalic anhydride end groups, e.g., in the 3,3', 3,4', 4,3' or the 4,4' positions and R', is a divalent organic radical selected from the class consisting of aromatic hydrocarbon radicals having from 6 to about 20 carbon atoms and halogenated derivatives thereof, alkylene radicals and cycloalkylene radicals having from about 2 to about 20 carbon atoms, $C_{(2-8)}$ alkylene termi- nated polydiorganosiloxane, and divalent radicals of the formula:

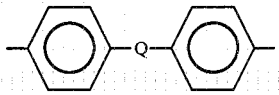

where Q is a direct bond or a member selected from the class consisting of

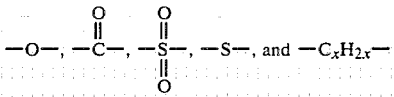

and x is an integer from 1 to 5.

13. The process of claim 12 wherein said polyetherimide is in a solid state.

14. The process of claim 13 wherein said polyetherimide is in a molten state.

* * * * *